United States Patent
Cutler

(10) Patent No.: US 8,130,257 B2
(45) Date of Patent: Mar. 6, 2012

(54) SPEAKER AND PERSON BACKLIGHTING FOR IMPROVED AEC AND AGC

(75) Inventor: Ross G. Cutler, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 922 days.

(21) Appl. No.: 12/163,527

(22) Filed: Jun. 27, 2008

(65) Prior Publication Data

US 2009/0322915 A1 Dec. 31, 2009

(51) Int. Cl.
*H04N 7/14* (2006.01)
(52) U.S. Cl. .................. 348/14.12; 382/103
(58) Field of Classification Search .......... 348/14.08, 348/14.12, 14.13, 221.9, 222.1, 221.1, 241, 348/251, 362, 366, 370, 103, 118; 375/240.1; 382/103, 118
See application file for complete search history.

(56) References Cited

U.S. PATENT DOCUMENTS

| | | |
|---|---|---|
| 6,453,336 B1 | 9/2002 | Beyda et al. |
| 6,803,954 B1 | 10/2004 | Hong et al. |
| 7,171,025 B2 | 1/2007 | Rui et al. |
| 2004/0022322 A1 | 2/2004 | Dye |
| 2004/0179591 A1 | 9/2004 | Wenger et al. |
| 2004/0267521 A1 | 12/2004 | Cutler et al. |
| 2005/0243168 A1 | 11/2005 | Cutler |
| 2008/0129844 A1* | 6/2008 | Cusack et al. ............... 348/241 |

FOREIGN PATENT DOCUMENTS

| | | |
|---|---|---|
| GB | 2 384 932 A | 8/2003 |
| WO | WO 99/57900 | 11/1999 |
| WO | WO 2007/007257 A1 | 1/2007 |

OTHER PUBLICATIONS

Zicheng Liu et al., "Learning-Based Perceptual Image Quality Improvement for Video Conferencing," 4 pages, https://research.microsoft.com/en-us/um/people/zliu/ICME07_LIGHT.pdf (2007).
Xuehai Bian et al., "Using Sound Source Localization to Monitor and Infer Activities in the Home," Georgia Institute of Technology, 16 pages, ftp://ftp.cc.gatech.edu/pub/gvu/tr/2004/04-20.pdf (2004).
A. Vahedian et al., ABSTRACT "Improving Videophone Subjective Quality Using Audio Information," *International Journal of Imaging Systems and Technology*, 2 pages, http://www3.interscience.wiley.com/cgi-bin/abstract/30000918/ABSTRACT?CRETRY=1&SRETRY=0 (1999).

* cited by examiner

Primary Examiner — Darryl J Collins
(74) Attorney, Agent, or Firm — Merchant & Gould

(57) ABSTRACT

Regions of interest in video image capture for communication purposes are selected based on one or more inputs based on sound source localization, multi-person detection, and active speaker detection using audio and/or visual cues. Exposure and/or gain for the selected region are automatically enhanced for improved video quality focusing on people or inanimate objects of interest.

20 Claims, 10 Drawing Sheets

SPEAKER AND PERSON BACKLIGHTING FOR IMPROVED AEC AND AGC

BACKGROUND

Video cameras such as webcams used for online video communications typically have insufficient dynamic range for many scenes, which may result in objects of interest being either under or over exposed. For cameras used in video conferencing applications, the most important objects of interest are people. For efficient capture of participants in a video conference, panoramic cameras may be used.

Many cameras provide a feature called backlighting which instructs the camera's auto exposure/gain algorithm to use a predefined image region—typically the center region or an outline of a person—to get a better image of people. However, in a panoramic camera there are multiple people in the scene and standard backlighting may not work in these scenarios. In addition, face detection has been used to dynamically change the backlighting region of interest, but the image has to be good enough (image quality and facial resolution) for face recognition to provide useful results.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to improving the image of a current speaker or other region of interest by determining selected region(s) of interest in video communications based on image motion, sound source localization, and active speaker detection followed by automatic exposure and/or gain control adjustment on the selected region(s). According to some embodiments, the enhancement may be superimposed on a pre-processed image with pre-defined bands weighted for different backlighting.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, regions of interest in video communications may be selected based on images, sound source localization, and/or active speaker detection. Exposure and/or gain adjustment of the image in the selected region may be performed over weighted backlighting regions such as in a panoramic camera. In the following detailed description, references are made to the accompanying drawings that form a part hereof and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
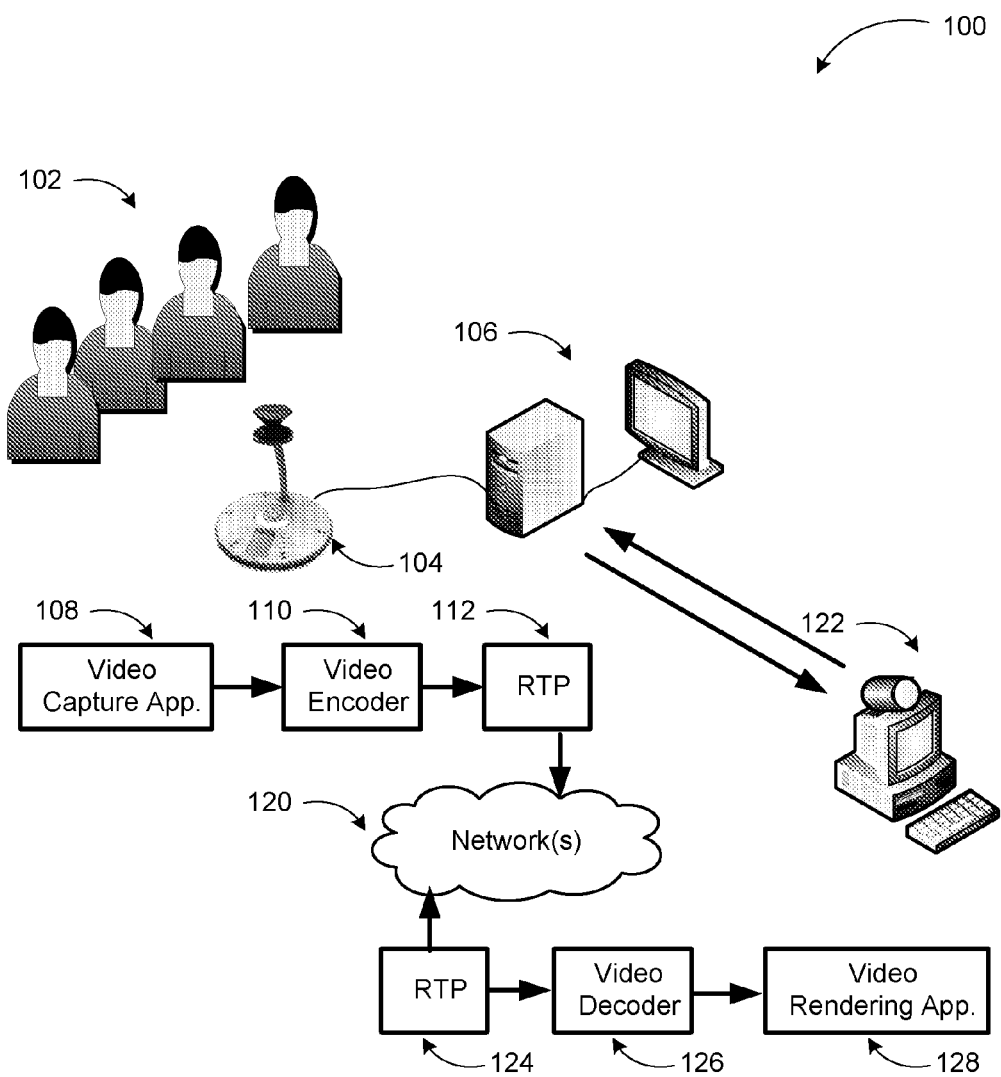
FIG. 1 is a conceptual diagram illustrating main components in a video communication system where selection of a region of interest for focusing on a person among multiple people may be desired.

Referring to FIG. 1, main components of video communication system 100, where selection of a region of interest for focusing on a person among multiple people may be desired are illustrated. With the proliferation of Internet-based communication tools and applications, video applications that provide video communication over private or public networks have grown in number and variety. Such applications may be local applications residing on local computing devices (e.g. 106, 122) or hosted applications executed by a service and used by a client device/application remotely. In any case, video images are captured by a camera device such as a webcam.

Video conferencing systems allow for meetings to occur with visual interaction despite the fact that meeting participants may be located in different geographic locations. The visual aspect of video conferencing makes it typically more appealing than telephone conferences, while at the same time being a lower-cost alternative to (and typically can occur on shorter notice than) in-person meetings when one or more participants must travel to the meeting location.

Figure 4:
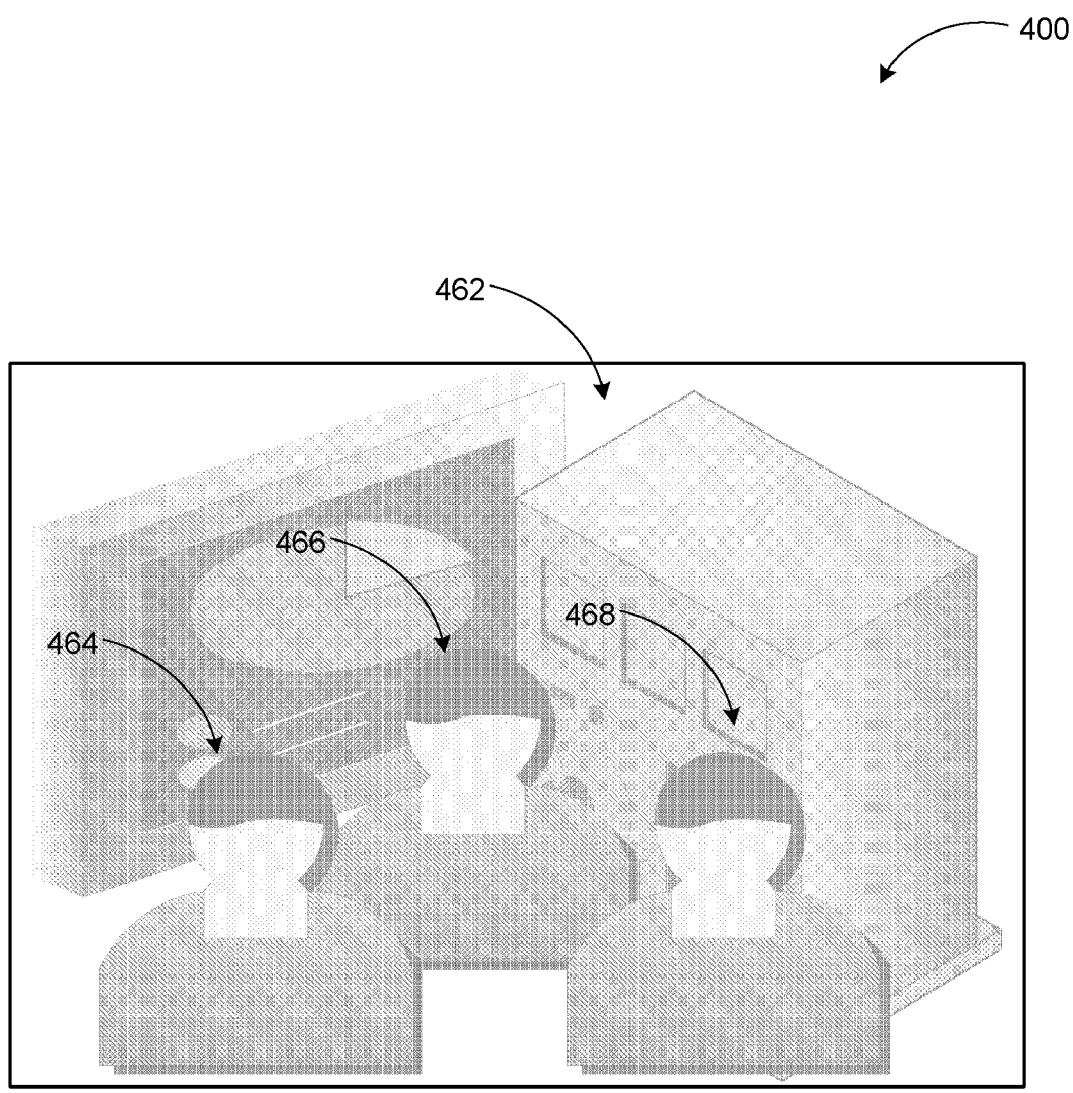
FIG. 4 illustrates an example video camera shot of multiple people, where conventional backlighting methods may not provide optimal image quality for a region of interest.

Some video conferencing systems use automated detection techniques or presets to move the camera (e.g., pan or tilt the camera) for focusing on specific regions or people if multiple people are participating in one location. Additionally, backlighting may not be optimal for a person (or region) of interest when background objects or multiple people in the same room are involved. If no adjustment is used, a person or region of interest (e.g. a whiteboard) may not be captured under optimum conditions as shown in FIG. 4.

In FIG. 1, computing device 106 represents a computer (e.g. a server) connected to the source for the video signals, which may be include a camera (104) capable of facilitating video communications; the camera can be a typical webcam or a panoramic (360 degree) camera. Other implementations may include video capture devices with their own processing and communication capability, client devices with video capability, and the like. A typical video communication begins at device computing 106 with a video capture application 108, which captures frames of video through the camera. The video signal may first be passed through one or more processing blocks for filtering, backlighting adjustments, and the like.

The processed video signal is encoded in video encoder 110 for transmission over a network and provided to Real Time Protocol (RTP) block 112 for formatting the signal to be transported over the network. Any one of a number of network transportation protocols may be employed to transmit the signal to a receiving device (e.g. computing device 122). Network(s) 120 may include private or public networks such as the Internet, or a combination of the two. The signal is received by another RTP block 124 at the receiving device and translated. Video decoder 126 decodes the signal and provides the decoded signal to rendering application 128, which renders it on a display. In a practical implementation, the communication is bidirectional and both devices include video capturing and rendering application(s) for real time video communication. However, embodiments are not so limited. Unidirectional real time communications such as a video seminar that is disseminated to multiple receivers may also employ a non-parametric sign based noise determination technique according to embodiments.

While some video capture systems may be manually programmed with participant information (e.g., the number of participants and their locations), this requires user-entry of the information being programmed, which tends to restrict participants' ability to move about the room, as well as the ability of participants to join or leave the conference room. Additionally, different participants may speak (thus, become the desired focus of video capture) at different times. Backlighting conditions in conference rooms (or wherever the video capture is taking place) may change depending on a number of factors such as ambient light, movements of people, and so on.

Thus, the ability to focus on a person of interest such as the current speaker minimizing a disadvantageous effect of backlighting conditions would greatly enhance the quality of image quality and video communication. In the system shown in FIG. 1, one aspect of the challenge is illustrated: selecting a person of interest among multiple people (102). In this scenario, the other participants may be considered background that is not a region of interest, while the selected person represents the region of interest for which the backlighting needs to be improved relative to the others.

Figure 2:
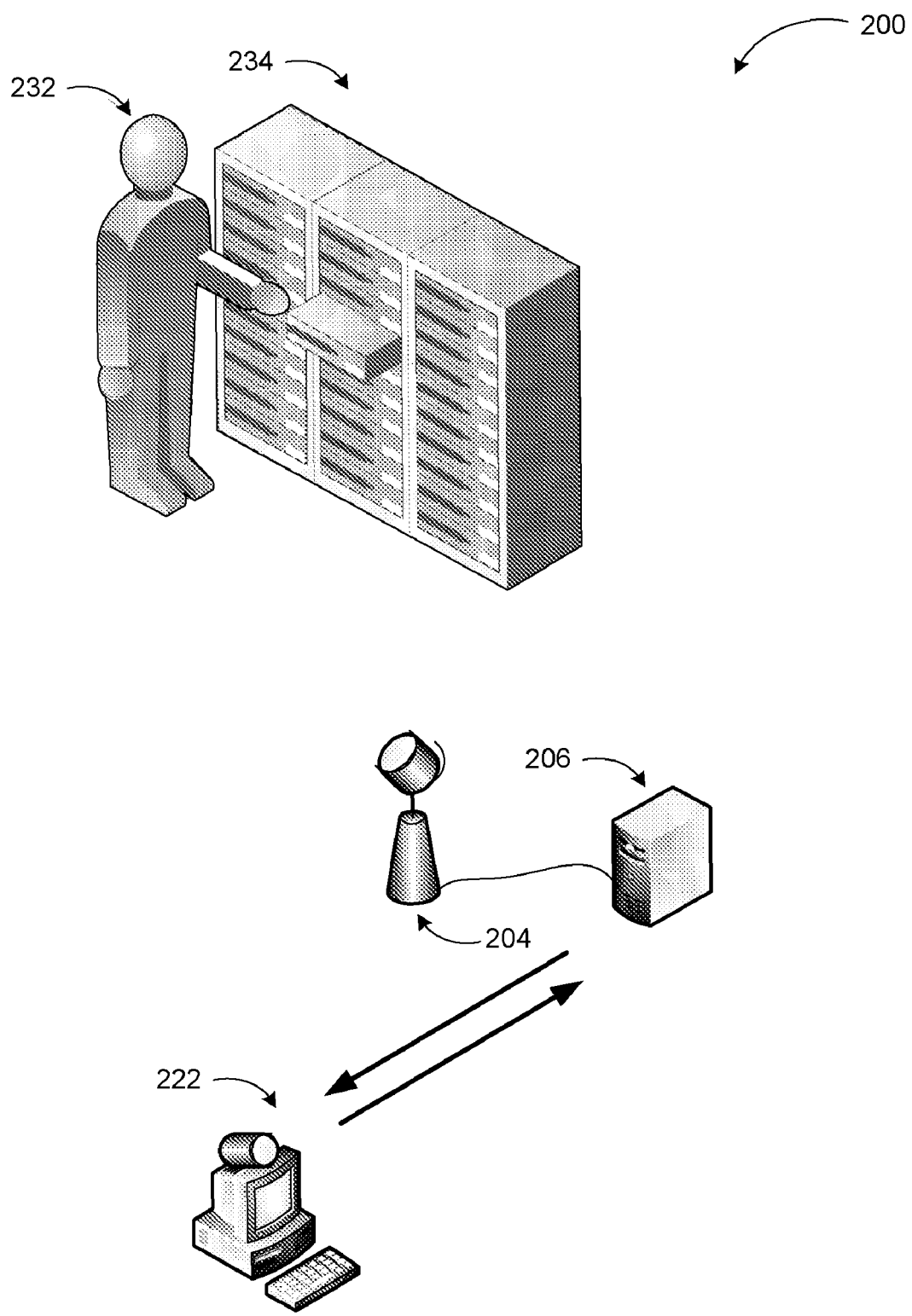
FIG. 2 is another conceptual diagram illustrating a video communication system where selection of a region of interest for focusing on a person in front of a background may be desired.

FIG. 2 is another conceptual diagram illustrating a video communication system where selection of a region of interest for focusing on a person in front of a background may be desired. Computing devices 206 and 222, as well as video capture device 204 operate as described in conjunction with FIG. 1.

Differently from FIG. 1, there is a single person 232 within the video capture area in FIG. 2 and a background comprising inanimate objects 234. If the video capture device takes the whole scene without making any image adjustments, the person to be captured in the video may not be captured with optimum image quality because of the background. The person may appear darker or lighter than desired in the rendered video. A sophisticated algorithm such as face recognition may be used to find a region of interest, but face recognition requires good image quality (e.g., good lighting) and sufficient facial resolution to work well. Alternatively, sound source localization and related speaker detection methods are more robust to lighting conditions and facial resolution and therefore can provide more reliable regions of interest.

Figure 3:
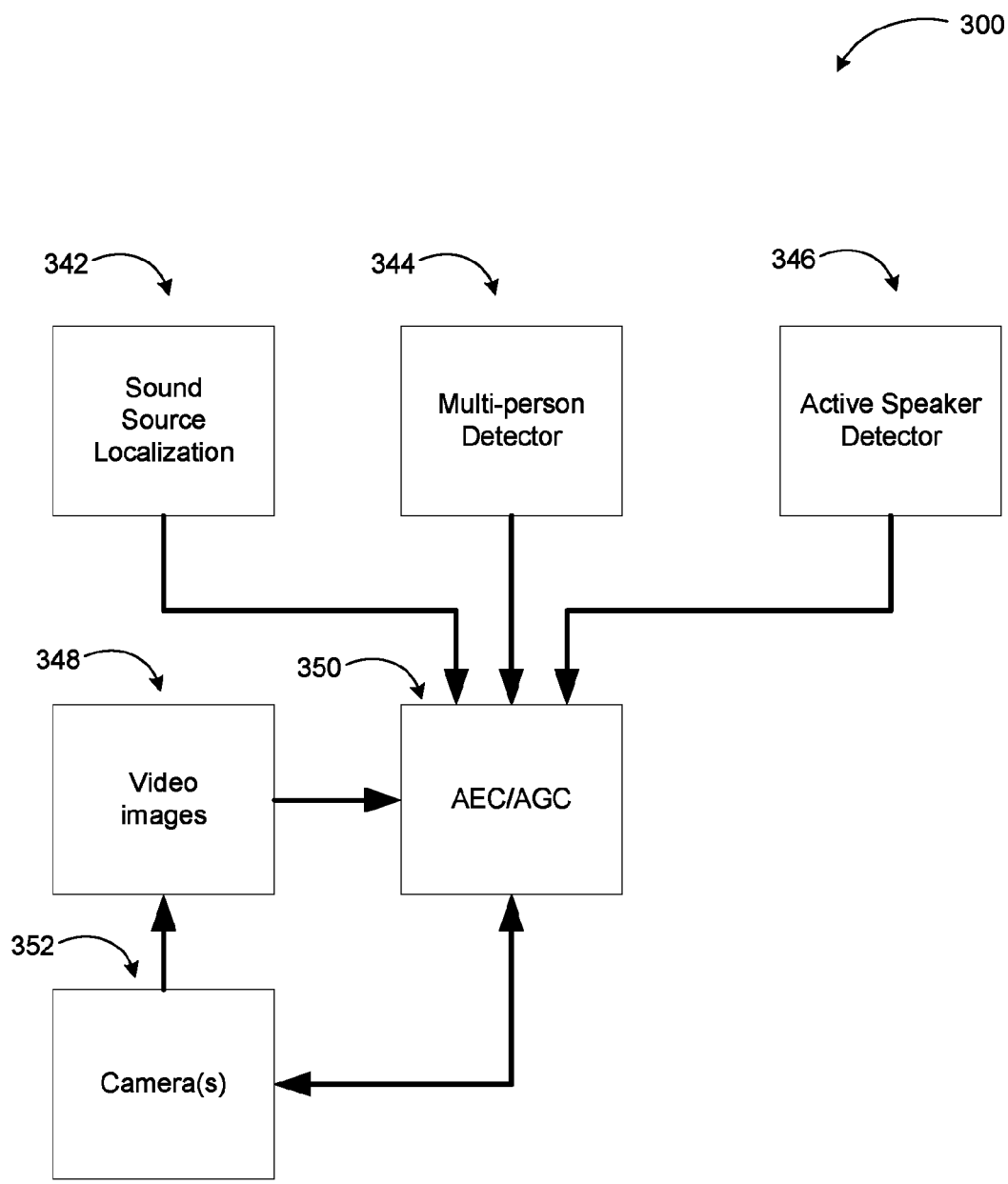
FIG. 3 illustrates an example block diagram of a system according to embodiments using sound source localization, multi-person detection, and active speaker detection for selecting a region of interest in video image capture.

FIG. 3 illustrates an example block diagram 300 of a system according to embodiments using sound source localization, multi-person detection, and active speaker detection for selecting a region of interest in video image capture.

In a video capture system, one or more cameras 352 capture video images 348. An automatic exposure/gain control (AEC/AGC) module 350 is used to improve image quality such as enhancing a person or region of interest through adjustment of exposure and/or gain for that portion of the video frame. While other approaches such as feedback loops may be used to manage the operation of the AEC/AGC module 350, a system according to embodiments may use one or more of three detection mechanisms to select the region of interest for enhancement.

The sound source localization, multi-person, and active speaker detectors 342, 344, 346 use audio and/or visual cues to select a region of interest. Sound source localization detector 342 uses audio features such as sound detection from multiple microphones to detect the location of the speaker among multiple people. The multi-person detector 344 uses motion and image features (such as contours of a person, facial recognition, etc.) to determine the speaker. The active speaker detector 346 uses sound source localization, motion, and image features to detect the current speaker. When light conditions are not optimal, multi-person detector 344 and active speaker detector 346 may fail. In that scenario, the sound source localization detector 342 may be the only module to provide useful input for selection of the region (person) of interest. If the region of interest is not the current speaker, but an inanimate object, such as a whiteboard, motion (in reverse, to detect no motion) and feature detection mechanisms may be employed instead of sound-based or personal feature detection mechanisms.

The AEC/AGC module 350 may be implemented as hardware, software, or a combination of the two. In a software implementation, an example algorithm for selection of regions based on input from one or more of the three detectors discussed above may be as follows:

```
While (1)
    Capture image
    backlight = pixel weights based on fixed backlighting
    ROI={MPD results, columns with SSL PDF peaks>T, ASD result}
    If ROI is non-empty
        A=0.7        // tunable parameter
        image_mean =
        A*mean(image*backlight) +(1-A)*mean(ROI)
    else
        image_mean = mean(image*backlight);
    end
    if image_mean > target + threshold
        if gain>0
            gain = gain-1
        else if exposure> 0
            exposure = exposure-1
        end
    else if image_mean <target-threshold
        if exposure <max_exposure
            exposure = exposure+1
        else if gain < max_gain
            gain = gain+1
        end
    end
end
```

A key aspect of the example algorithm is selecting the region of interest used to compute the image mean (which is used to determine whether to change the exposure or gain). The pixels that are likely to include people are selected. A fixed backlighting region may be used (e.g. one of a weighted regions as described in FIG. 7), but when the sound source localization, multi-person, and active speaker detectors (342, 344, 346) indicate additional region(s), those are used to improve the exposure/gain settings.

FIG. 4 illustrates an example video camera shot (400) of multiple people, where conventional backlighting methods may not provide optimal image quality for a region of interest. Camera shot includes multiple video conference participants 464, 466, and 468 in front of background objects 462. Some cameras may provide backlighting feature using a predefined image region (typically the center region or an outline of a person) in the automatic exposure control (AEC) and/or automatic gain control (AGC) algorithm to get a better image of people. However, these features may be resource intensive or may not work in some camera types (e.g. in a panoramic camera the person is often not in the center of the image). Thus, backlighting on its own may not work very well, and the image may appear darker or lighter than desired as shown in the figure.

Figure 5:
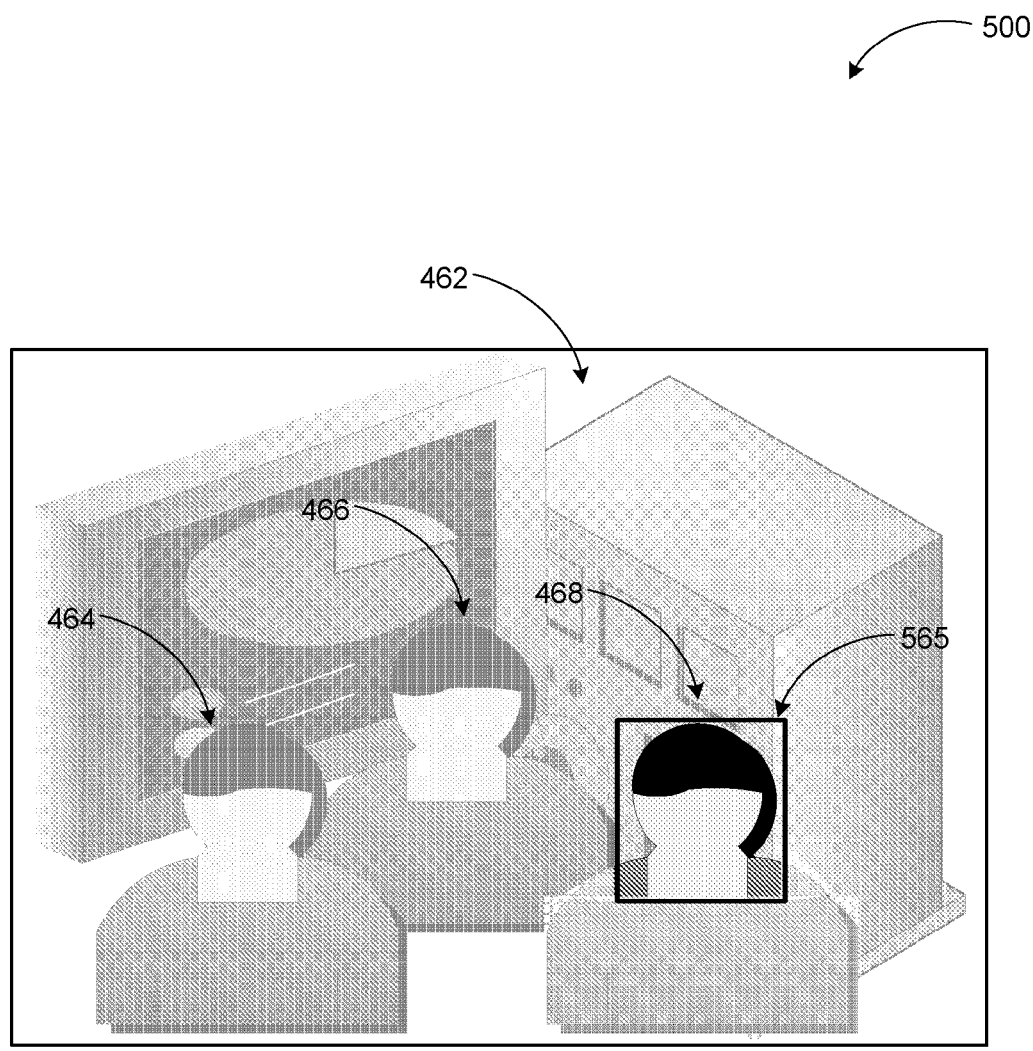
FIG. 5 illustrates selection of a region of interest according to embodiments focusing on one person of the video camera shot of FIG. 4.

FIG. 5 illustrates selection of a region of interest according to embodiments focusing on one person of the video camera shot of FIG. 4. Camera shot 500 includes the same three people 464, 466, and 468 with background objects 462. Differently from FIG. 4, in this case, the video capture application is configured to select a region based on input from at least one of sound source localization, multi-person detection, and active speaker detection modules. Based on the input, the currently speaking person (468) is selected as indicated by the rectangle 565. In response to the input, the automatic gain control and/or automatic exposure control for the camera can be adjusted such that the portion of the image around the selected person is improved and the image quality is optimal with the selected person in focus.

Figure 6:
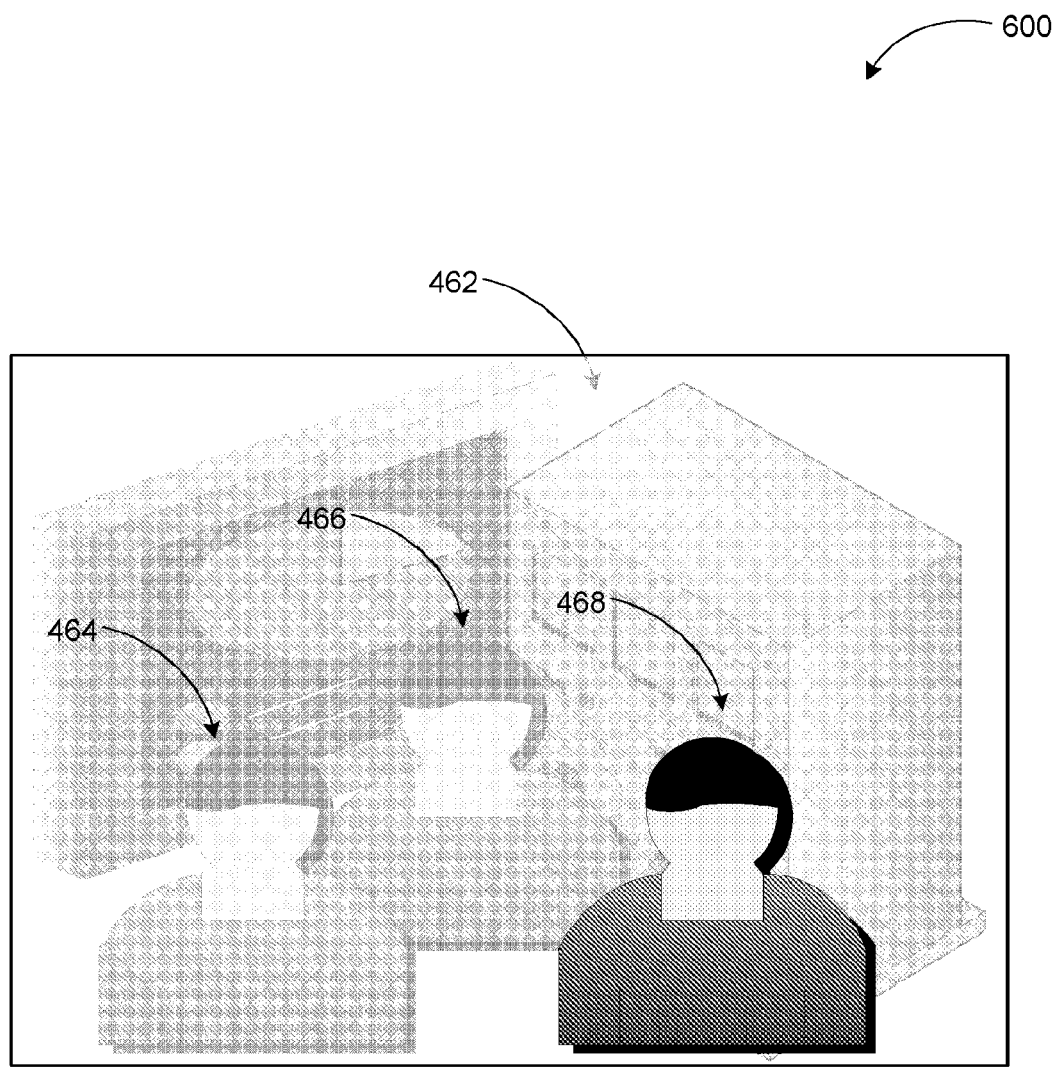
FIG. 6 illustrates an enhanced version of the video camera shot of FIG. 4 after selection of the region of interest and automatic exposure/gain control adjustment on the selected region according to embodiments.

FIG. 6 illustrates an enhanced version of the video camera shot of FIG. 4 after selection of the region of interest and automatic exposure/gain control adjustment on the selected region according to embodiments. As described above, person 468 is selected as region of interest for enhancement based on input from one or more of sound source localization, multi-person detection, and active speaker detection modules. The resulting camera shot 600 shows person 468 with improved backlighting, thus improved image quality. While a person is used as an example of region of interest in FIG. 4 through FIG. 6, the region of interest is not limited to persons. The above described techniques may also be used for improving backlighting on any region of interest including, but not limited to, inanimate objects (e.g. a whiteboard).

Figure 7:
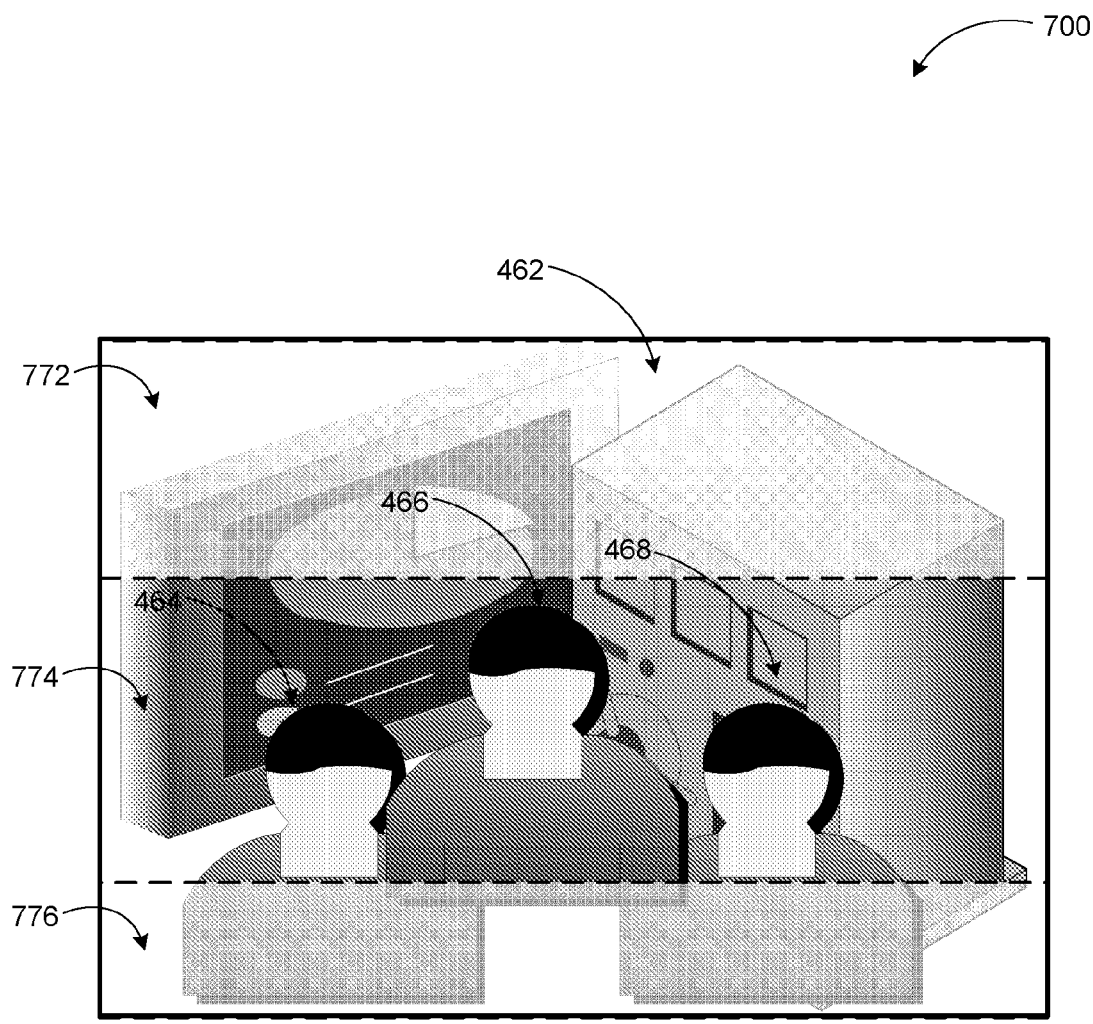
FIG. 7 illustrates another example video camera shot implementing fixed backlighting using weighted bands before selection of a region of interest according to embodiment.

FIG. 7 illustrates another example video camera shot implementing fixed backlighting using weighted bands before selection of a region of interest according to embodiment. As mentioned previously, a wide variety of different camera systems may be used with video conferencing systems, such as conventional pan/tilt/zoom cameras, 360-degree panorama cameras (e.g., which can pan/tilt/zoom digitally rather than mechanically), etc. One such 360-degree panorama camera system may use a camera pointed at a parabolic mirror device, and then use various calibration techniques to de-warp the image to normal images from which a 360-degree omni-directional image about the camera can be constructed. Another such 360-degree panorama camera system may use multiple cameras (each having a less-than-360-degree field-of-view) arranged so that together they provide an approximately 360-degree field-of-view.

In panoramic camera systems, fixed regions of the camera shot may be processed according to predefined weight factors for backlighting as shown in camera shot 700. For example, to improve the image quality of people participating in a video conference, a center band 774 may be assigned a higher weight factor relative to upper and lower bands (772, 776), which typically contain background objects. While this approach improves the visibility (image quality) for the people in the camera shot, all people in the camera shot are still shown with equal backlighting. Thus, a method of enhancing a selected region of interest based on one of the input mechanisms described above may be employed in addition to the weighted backlighting of the camera shot according to some embodiments.

The methods described above for selection of regions of interest are not limited to the listed examples. Other input mechanisms in addition to sound source localization, multi-person detection, and active speaker detection modules, may also be employed for selecting regions of interest to apply enhanced automatic exposure/gain control using the principles described herein.

Figure 8:
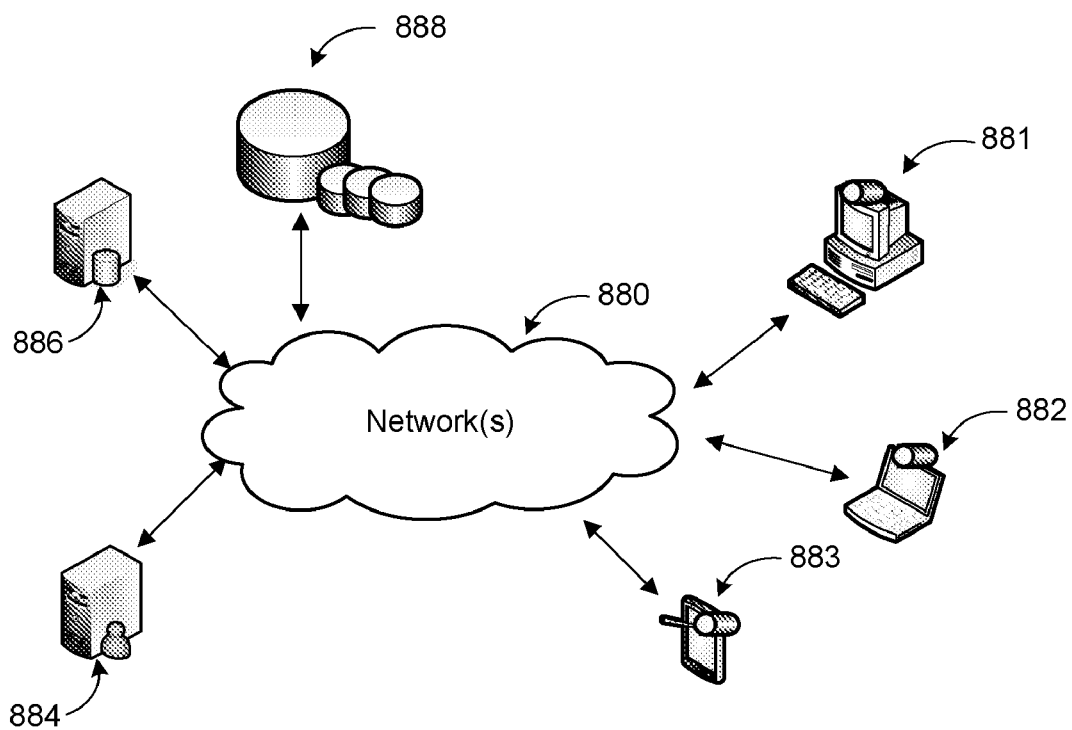
FIG. 8 illustrates a networked environment where embodiments may be implemented.

FIG. 8 is an example networked environment, where embodiments may be implemented. A speaker and person backlighting for improved exposure and/or gain control according to embodiments may be implemented locally or in a distributed manner over a number of physical and virtual clients and servers. It may also be implemented in un-clustered systems or clustered systems employing a number of nodes communicating over one or more networks (e.g. network(s) 880).

Such a system may comprise any topology of servers, clients, Internet service providers, and communication media. Also, the system may have a static or dynamic topology. The term "client" may refer to a client application or a client device. While a networked system implementing embodiments may involve many more components, relevant ones are discussed in conjunction with this figure.

Video capture applications may be executed and video rendered in individual client devices 881-883. Improved exposure and/or gain control based on a region selection according to embodiments may be implemented in each of the individual applications or in a single distributed application that manages video communications for all participating client devices. If the video application is part of a communication application (or service), the application or service may be managed by one or more servers (e.g. server 884). A portion or all of the generated video may be stored instead of being instantaneously rendered. In that scenario, the video files may be stored in a data store such as data stores 888 and provided to the video rendering application(s) in individual client devices subsequently through database server 886 or retrieved directly by the video rendering application(s).

Network(s) 880 may include a secure network such as an enterprise network, an unsecure network such as a wireless open network, or the Internet. Network(s) 880 provide communication between the nodes described herein. By way of example, and not limitation, network(s) 880 may include wired media such as a wired network or direct-wired connection, and wireless media such as acoustic, RF, infrared and other wireless media.

Many other configurations of computing devices, applications, data sources, data distribution systems may be employed to implement a video communication system with backlighting region selection for improved exposure and/or gain control. Furthermore, the networked environments discussed in FIG. 8 are for illustration purposes only. Embodiments are not limited to the example applications, modules, or processes.

Figure 9:
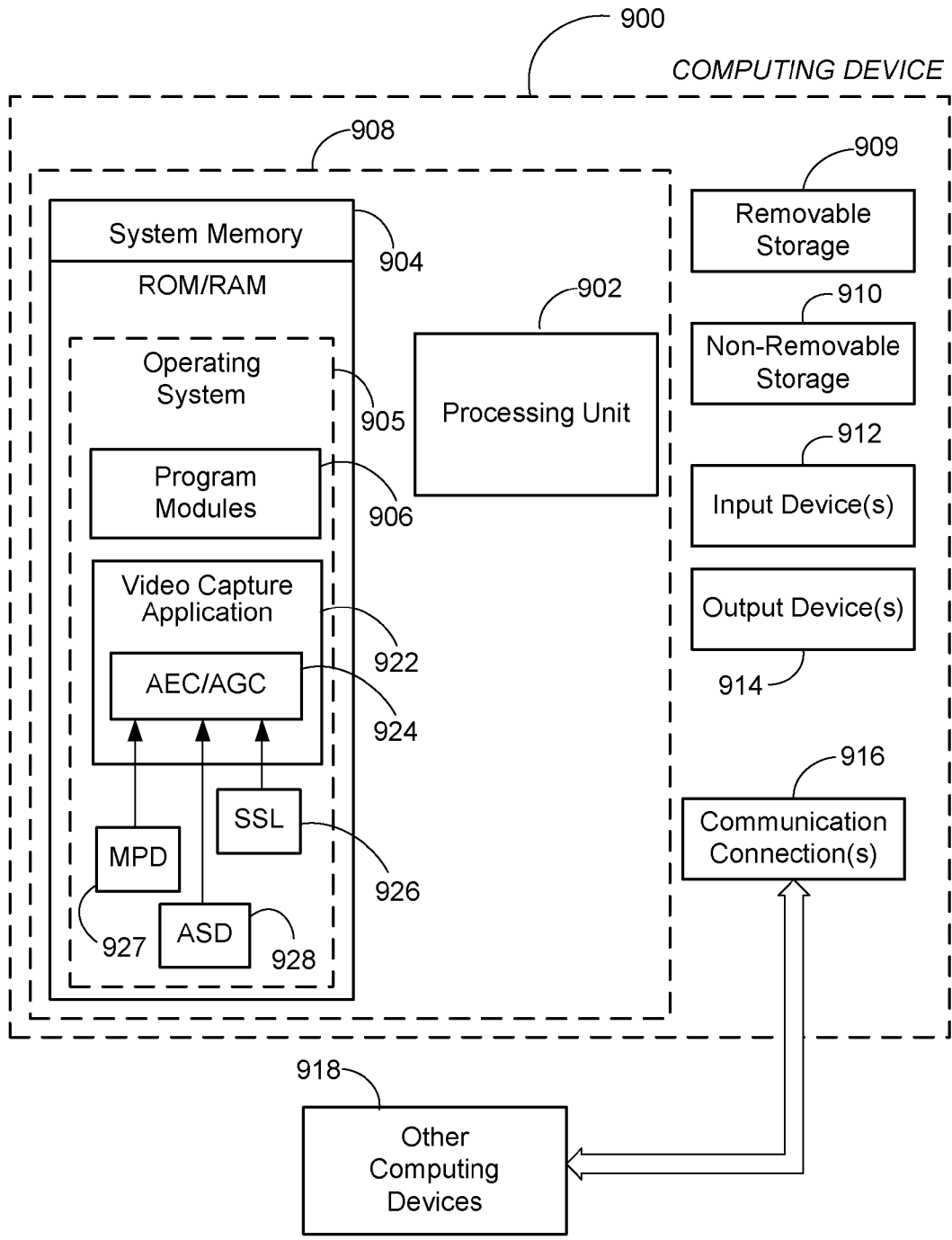
FIG. 9 is a block diagram of an example computing operating environment, where embodiments may be implemented.

FIG. 9 and the associated discussion are intended to provide a brief, general description of a suitable computing environment in which embodiments may be implemented. With reference to FIG. 9, a block diagram of an example computing operating environment is illustrated, such as computing device 900. In a basic configuration, the computing device 900 may be a client device executing a video capture application and typically include at least one processing unit 902 and system memory 904. Computing device 900 may also include a plurality of processing units that cooperate in executing programs. Depending on the exact configuration and type of computing device, the system memory 904 may be volatile (such as RAM), non-volatile (such as ROM, flash memory, etc.) or some combination of the two. System memory 904 typically includes an operating system 905 suitable for controlling the operation of the computing device, such as the WINDOWS® operating systems from MICROSOFT CORPORATION of Redmond, Wash. The system memory 904 may also include one or more software applications such as program modules 906, video capture application 922, automatic exposure/gain control module 924, and at least one of sound source localization, multi-person detection, and active speaker detection modules (926-928).

Video capture application 922 may be a separate application or an integral module of a hosted service application that provides video capture based on received video signals from a camera associated with computing device 900. Automatic exposure/gain control module 924 provides exposure and/or gain control services for improving video image quality for selected regions based on input from one of the modules 926-928, as described previously. This basic configuration is illustrated in FIG. 9 by those components within dashed line 908.

The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by removable storage 909 and non-removable storage 910. Computer storage media may include volatile and non-volatile, removable and non-removable media implemented in any method or technology for storage of information, such as computer readable instructions, data structures, program modules, or other data. System memory 904, removable storage 909 and non-removable storage 910 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of device 900. Computing device 900 may also have input device(s) 912 such as keyboard, mouse, pen, voice input device, touch input device, etc. Output device(s) 914 such as a display, speakers, printer, etc. may also be included. These devices are well known in the art and need not be discussed at length here.

The computing device 900 may also contain communication connections 916 that allow the device to communicate with other computing devices 918, such as over a wireless network in a distributed computing environment, for example, an intranet or the Internet. Other computing devices 918 may include client devices or server(s) that execute applications associated with rendering video signals from video capture application 922 in computing device 900. Communication connection 916 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. While the presence of a modulated data signal may be transitory in nature, the signal is generated to cause changes in a receiving device, thereby creating physical and tangible changes (effects) during its reception by the receiving device. By way of example, and not limitation, communication media includes wired media such as a wired network or direct-wired connection, and wireless media such as acoustic, RF, infrared and other wireless media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 10:
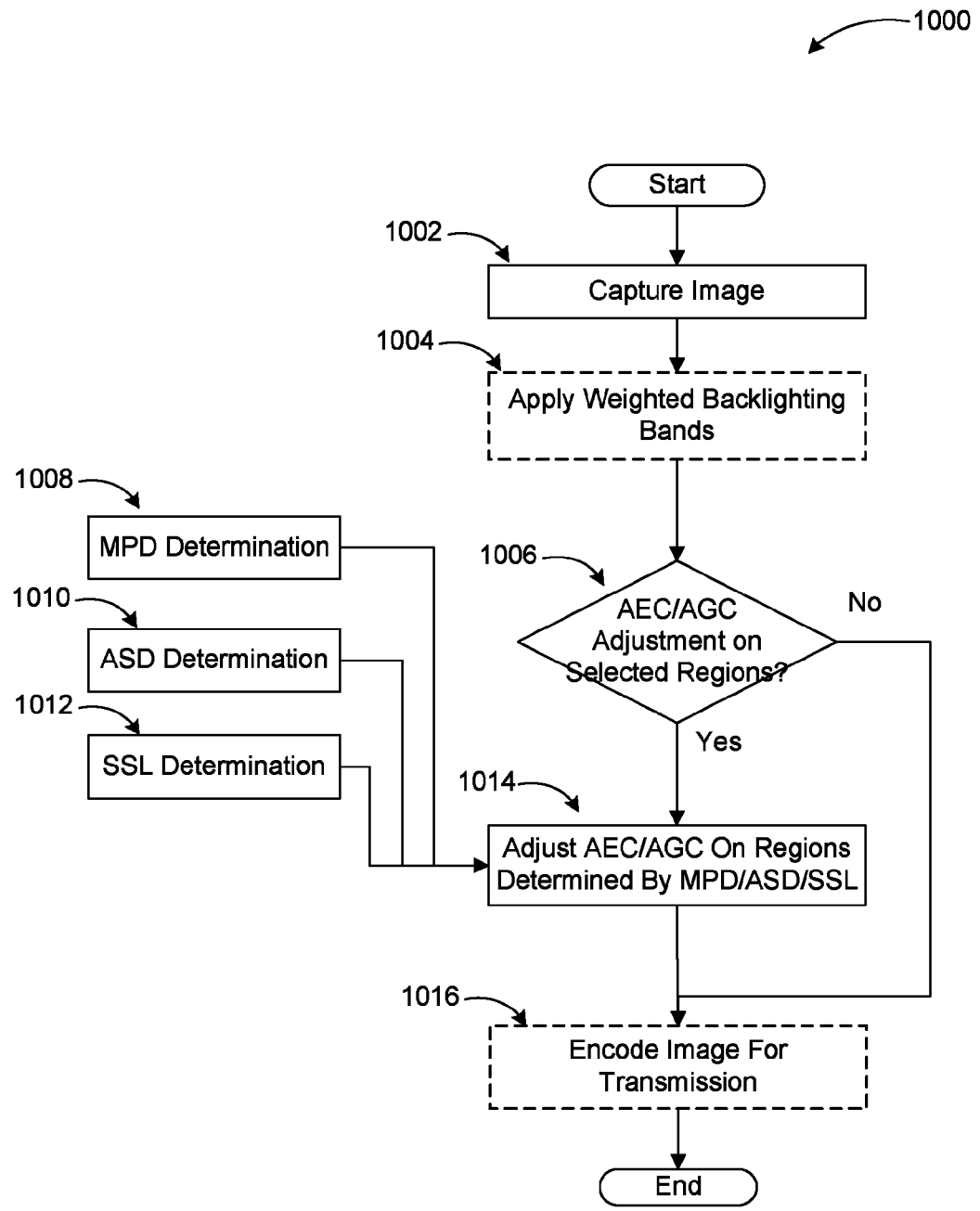
FIG. 10 illustrates a logic flow diagram for a process of selecting regions of interest for automatic exposure/gain control adjustment according to embodiments.

FIG. 10 illustrates a logic flow diagram for process 1000 of selecting regions of interest for exposure and/or gain enhancement according to embodiments. Process 1000 may be implemented, for example, as part of the video capture application 108 of FIG. 1.

Process 1000 begins with operation 1002, where a frame of video is captured. Processing advances from operation 1002 to optional operation 1004, where fixed regions of the camera shot may be assigned backlighting weight factors such as horizontal bands in a panoramic camera in order to enhance participants in a video conference. Processing moves from optional operation 1004 to decision operation 1006.

At decision operation 1006, a determination is made whether automatic exposure or gain adjustments on selected region(s) are to be performed based on input from one or more detection sources. If no further adjustment is to be made, processing moves to optional operation 1016 for encoding of the captured image for transmission. Of course, other processing operations such as temporal filtering, noise filtering, etc. may be performed prior to encoding of the captured frame.

If exposure and/or gain adjustment on selected region(s) is to be performed, the adjustment is performed by the AEC/AGC module at operation 1014 following decision operation 1006. The adjustment (improvement of backlighting for selected region(s) of interest) is performed based on input (region selection) from one or more of multi-person detection, and active speaker detection, sound source localization operations (1008, 1010, and 1012).

After operation 1014, processing advances to optional operation 1016, where the captured image is encoded for transmission. As mentioned above, additional processing may also be performed prior to or following encoding of the captured video frame.

The operations included in process 1000 are for illustration purposes. Speaker and person backlighting for improved automatic exposure/gain control may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for improving image quality of a selected region in a video frame, the method comprising:
    receiving a captured video frame;
    determining a region of interest based on input through at least one from a set of: sound source localization, multi-person detection, and active speaker detection;
    automatically adjusting at least one of an exposure parameter and a gain parameter for the determined region of interest, the region of interest being utilized to compute an image mean for determining whether to change the at least of the exposure parameter and the gain parameter, such that the image quality of the region of interest is improved; and
    encoding the video frame for at least one of transmission and storage.

2. The method of claim 1, further comprising:
    prior to determining the region of interest, dividing the video frame into at least two backlighting bands;
    assigning different weight factors to the backlighting bands; and
    adjusting a backlighting of each band based on the assigned weight factors.

3. The method of claim 2, further comprising:
    dividing the video frame into the backlighting bands based on an expected position of one of persons and objects of interest within the video frame, wherein the weight factors are assigned such that a backlighting band containing one of the persons and objects of interest is rendered more prominent than other bands.

4. The method of claim 2, wherein the backlighting bands are horizontal bands in a video frame captured by one of: a wide field-of-view camera and a 360-deg panorama camera.

5. The method of claim 1, wherein automatically adjusting at least one of the exposure parameter and the gain parameter includes:
    computing an image statistical distribution based on pixel values of the region of interest weighted based on backlighting and the input from the sound source localization, multi-person detection, and active speaker detection;
    comparing the computed image statistical distribution to a threshold value; and
    adjusting at least one of a gain and an exposure for processing the pixel value based on the comparison.

6. The method of claim 5, wherein the image statistical distribution includes one of: an image mean and an image median.

7. The method of claim 1, wherein the sound source localization provides input for determination of a region of interest based on audio features, and the multi-person detection provides input based on image features.

8. The method of claim 1, wherein the active speaker detection provides input based on a weighted comparison of at least one from a set of audio feature detection through a plurality of microphones and image feature detection.

9. The method of claim 1, further comprising determining a region of interest containing an inanimate object based on the inputs from sound source localization, multi-person detection, and active speaker detection.

10. A computing device for improving image quality of a region of interest in a video communication application, comprising:
    a memory
    a video capture device configured to capture frames of video;
    a processor coupled to the memory and the video capture device, and configured to execute a video processing application, the video processing application comprising:
    a pre-processing module for:
    receiving a captured video frame;
    a selection module for:
    determining the region of interest based on input through at least one from a set of: sound source localization, multi-person detection, and active speaker detection;
    an automatic gain/exposure control module for:
    adjusting at least one of a gain and an exposure for a portion of the video frame containing the region of interest by computing an image mean for pixel values of the portion of the video frame weighted based on fixed backlighting for the portion of the video frame and comparing the computed image mean to a threshold value for determining at least one of a new gain parameter and a new exposure parameter; and
    an encoding module for:
    encoding the processed video frame for subsequent transmission to a video rendering application; and a communication device configured to transmit encoded frames to another computing device over a network for one of rendering and storage.

11. The computing device of claim 10, wherein the image mean is computed by adding a mean of a product of the pixel values for the whole video frame with a fixed backlighting value and a mean of the pixel values of the portion of the video frame in a weighted manner.

12. The computing device of claim 11, wherein the new gain parameter and the new exposure parameter are determined by:
  if the computed image mean is greater than a sum of a target value and the threshold value and if an original gain parameter is greater than zero, setting the new gain parameter as the original gain parameter minus a predefined value; and
  if the computed image mean is greater than the sum of the target value and the threshold value, the original gain parameter is less than zero, and an original exposure parameter is greater than zero, setting the new exposure parameter as the original exposure parameter minus the predefined value.

13. The computing device of claim 12, wherein the new gain parameter and the new exposure parameter are further determined by:
  if the computed image mean is less than a difference of the target value and the threshold value and if the original gain parameter is less than a maximum gain value, setting the new gain parameter as the original gain parameter plus the predefined value; and
  if the computed image mean is less than the sum of the target value and the threshold value, the original exposure parameter is less than a maximum exposure value, setting the new exposure parameter as the original exposure parameter plus the predefined value.

14. The computing device of claim 13, wherein the predefined value is determined dynamically based on video capture device characteristics.

15. The computing device of claim 10, wherein the sound source localization, multi-person detection, and active speaker detection are performed by a combination of hardware and software external to the computing device.

16. The computing device of claim 10, wherein the selection module is an integral part of the automatic gain/exposure control module.

17. The computing device of claim 10, wherein the pre-processing module is further configured to perform filtering of the captured video frame.

18. A computer-readable storage medium with instructions stored thereon for improving image quality of a selected person in a video conference application, the instructions comprising:
  receiving a captured video frame;
    dividing the video frame into at least two backlighting bands;
    assigning different weight factors to the backlighting bands; and
    adjusting a backlighting of each band based on the assigned weight factors such that the backlighting band containing at least the selected person is rendered more prominent than other bands;
  determining the selected person based on input through at least one from a set of: sound source localization, multi-person detection, and active speaker detection;
  determining at least one of a new gain parameter and a new exposure parameter for a portion of the video frame containing the selected person by computing an image mean for pixel values of the video frame and the portion of the video frame weighted based on corresponding backlighting bands and comparing the computed image mean to a target value and threshold value such that the selected person becomes prominent within the video frame based on the application of the new gain parameter and the new exposure parameter;
  encoding the processed video frame; and
  transmitting encoded frames to another computing device over a network for one of rendering and storage.

19. The computer-readable storage medium of claim 18, wherein the instructions further comprise:
  if a new person is selected during the video conference based on new input through at least one from the set of: sound source localization, multi-person detection, and active speaker detection, re-determining a new gain parameter and a new exposure parameter for another portion of the video frame containing the newly selected person.

20. The computer-readable storage medium of claim 18, wherein video frame is an omni-directional image captured by a panoramic video conferencing camera.

* * * * *